(12) United States Patent
Tanaka

(10) Patent No.: US 10,819,873 B2
(45) Date of Patent: Oct. 27, 2020

(54) IMAGE PROCESSING APPARATUS CAPABLE OF SUPPRESSING DEGRADATION OF IMAGE QUALITY, CAUSED BY ELECTROSTATIC NOISE, METHOD OF CONTROLLING SAME, AND STORAGE MEDIUM

(71) Applicant: CANON KABUSHIKI KAISHA, Tokyo (JP)

(72) Inventor: Yasutomo Tanaka, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/117,319

(22) Filed: Aug. 30, 2018

(65) Prior Publication Data

US 2019/0075215 A1  Mar. 7, 2019

(30) Foreign Application Priority Data

Sep. 6, 2017  (JP) ................................ 2017-171328

(51) Int. Cl.
*H04N 1/00*  (2006.01)

(52) U.S. Cl.
CPC ..... *H04N 1/00994* (2013.01); *H04N 1/00037* (2013.01); *H04N 1/00074* (2013.01); *H04N 1/00344* (2013.01); *H04N 1/00933* (2013.01)

(58) Field of Classification Search
CPC .......... H04N 1/00994; H04N 1/00037; H04N 1/00074; H04N 1/00933; H04N 1/00344
See application file for complete search history.

(56) References Cited

U.S. PATENT DOCUMENTS

| 8,522,060 B2 | 8/2013 | Nasu | |
|---|---|---|---|
| 2006/0182451 A1* | 8/2006 | Shoji | G03G 15/55 399/9 |
| 2013/0021641 A1* | 1/2013 | Park | G06F 3/121 358/1.14 |
| 2017/0339289 A1* | 11/2017 | Tao | H04N 1/00265 |

FOREIGN PATENT DOCUMENTS

| JP | 2009253908 A | 10/2009 |
|---|---|---|
| JP | 2010211358 A | 9/2010 |

\* cited by examiner

*Primary Examiner* — Eric A. Rust

(74) *Attorney, Agent, or Firm* — Rossi, Kimms & McDowell LLP

(57) ABSTRACT

An image processing apparatus capable of suppressing degradation of the image quality of output image data, caused by electrostatic noise, without increasing a circuit scale. The image processing apparatus transmits image data obtained by reading an original, in synchronism with a synchronization signal. Noise in the synchronization signal is detected and eliminated. An image is printed using the image data. The number of times of detection of the noise is counted, and a notification indicative of the number of times of detection of the noise is made.

17 Claims, 11 Drawing Sheets

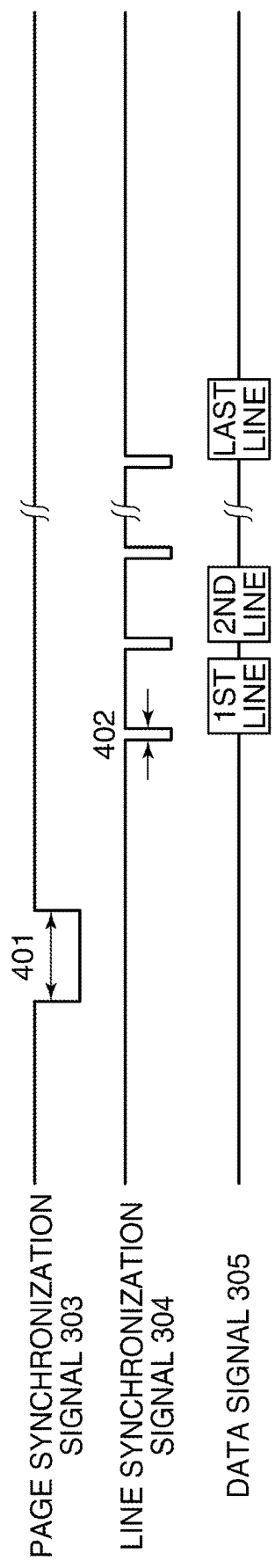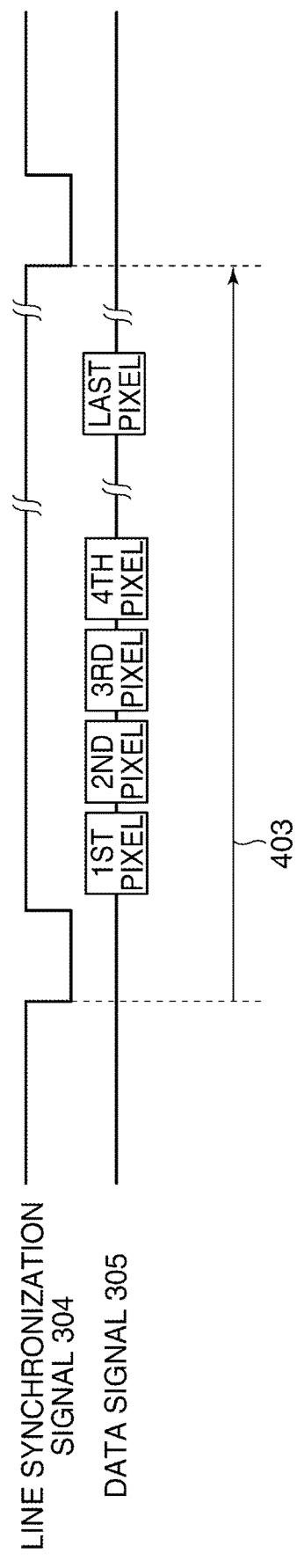

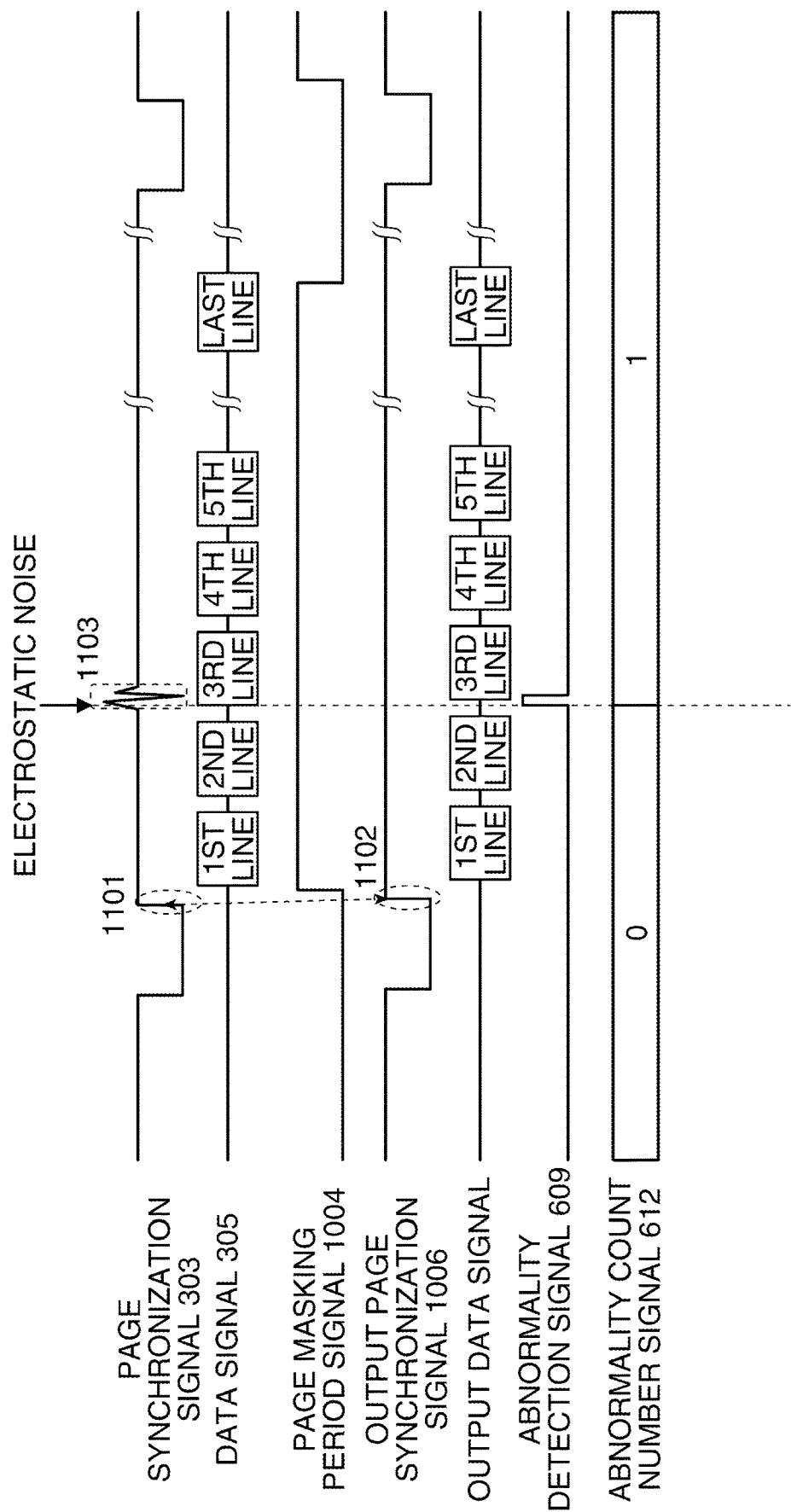

IMAGE PROCESSING APPARATUS CAPABLE OF SUPPRESSING DEGRADATION OF IMAGE QUALITY, CAUSED BY ELECTROSTATIC NOISE, METHOD OF CONTROLLING SAME, AND STORAGE MEDIUM

BACKGROUND OF THE INVENTION

Field of the Invention

The present invention relates to an image processing apparatus that is capable of suppressing degradation of image quality, caused by electrostatic noise, a method of controlling the same, and a storage medium.

Description of the Related Art

There has been known an image processing apparatus including a scanner section that scans an original, and a controller that generates output image data of the scanned original, such as PDF data. The scanner section reads each page of an original, and transmits a data signal indicative of the contents of the read original to the controller. Further, the scanner section transmits a page synchronization signal indicative of a page feed position in the data signal, and a line synchronization signal indicative of a line feed position in the data signal to the controller in synchronism with the data signal. The controller generates output image data having the same contents as the read original, by subjecting the contents of the original obtained from the acquired data signal to line feed based on the line synchronization signal, and further page feed based on the page synchronization signal.

Incidentally, the image processing apparatus sometimes has abnormalities occurring in the page synchronization signal and the line synchronization signal due to electric noise applied from the outside of the image processing apparatus (hereinafter referred to as the "electrostatic noise"). If abnormalities occur in the page synchronization signal and the line synchronization signal, the controller cannot grasp the correct page feed position and line feed position, which makes it impossible for the controller to generate output image data having the same contents as the original. To solve this problem, there has been proposed a technique for eliminating abnormalities from the page synchronization signal and the line synchronization signal (see e.g. Japanese Laid-Open Patent Publication (Kokai) No. 2009-253908).

In the image processing apparatus, the scanner section and the controller are connected on a printed circuit board by a plurality of wires associated respectively with the data signal, the page synchronization signal, and the line synchronization signal. Due to restriction of arrangement on the printed circuit board, the wire for the data signal is sometimes arranged adjacent to the wire for the page synchronization signal or the wire for the line synchronization signal. In this case, an abnormality also occurs in the data signal due to electrostatic noise, and even when abnormalities are eliminated from the page synchronization signal and the line synchronization signal by using the technique disclosed in Japanese Laid-Open Patent Publication (Kokai) No. 2009-253908, the image quality of the output image data is degraded by the abnormality of the data signal. To solve this problem, the image processing apparatus holds one line of data of the data signal in a buffer memory provided therein, and replaces the one line of data of the data signal determined as abnormal with the preceding line of data of the data signal (see e.g. Japanese Laid-Open Patent Publication (Kokai) No. 2010-211358). This makes it possible to suppress degradation of the image quality of the output image data, caused by electrostatic noise.

However, to use the above-described method of replacing the one line of data of the data signal determined as abnormal, it is necessary to have a buffer memory for holding the one line of data of the data signal to suppress degradation of the image quality of the output image data, which increases a circuit scale. That is, the conventional method cannot suppress degradation of the image quality of the output image data, caused by electrostatic noise, without increasing the circuit scale.

SUMMARY OF THE INVENTION

The present invention provides an image processing apparatus that is capable of suppressing degradation of the image quality of output image data, caused by electrostatic noise, without increasing a circuit scale, a method of controlling the same, and a storage medium.

In a first aspect of the present invention, there is provided an image processing apparatus that transmits image data obtained by reading an original, in synchronism with a synchronization signal, comprising a noise detection unit configured to detect noise in the synchronization signal, a noise elimination unit configured to eliminate noise from the synchronization signal, a print unit configured to print an image using the image data, a count unit configured to count the number of times of detection of the noise, and a notification unit configured to notify the number of times of detection of the noise, counted by the count unit.

In a second aspect of the present invention, there is provided a method of controlling an image processing apparatus that transmits image data obtained by reading an original, in synchronism with a synchronization signal, comprising detecting noise in the synchronization signal, eliminating noise from the synchronization signal, printing an image using the image data, counting the number of times of detection of the noise, and notifying the counted number of times of detection of the noise.

In a third aspect of the present invention, there is provided a non-transitory computer-readable storage medium storing a computer-executable program for executing a method of controlling an image processing apparatus that transmits image data obtained by reading an original, in synchronism with a synchronization signal, wherein the method comprises detecting noise in the synchronization signal, eliminating noise from the synchronization signal, printing an image using the image data, counting the number of times of detection of the noise, and notifying the counted number of times of detection of the noise.

According to the present invention, it is possible to suppress degradation of the image quality of output image data, caused by electrostatic noise, without increasing a circuit scale.

Further features of the present invention will become apparent from the following description of exemplary embodiments (with reference to the attached drawings).

BRIEF DESCRIPTION OF THE DRAWINGS

FIGS. 4A and 4B are diagrams useful in explaining changes in respective states of a page synchronization signal and a line synchronization signal which are output from an image reading controller appearing in FIG. 3.

FIG. 11 is a diagram useful in explaining a relationship between the page synchronization signal and an output page synchronization signal.

DESCRIPTION OF THE EMBODIMENTS

The present invention will now be described in detail below with reference to the accompanying drawings showing embodiments thereof.

Figure 1:
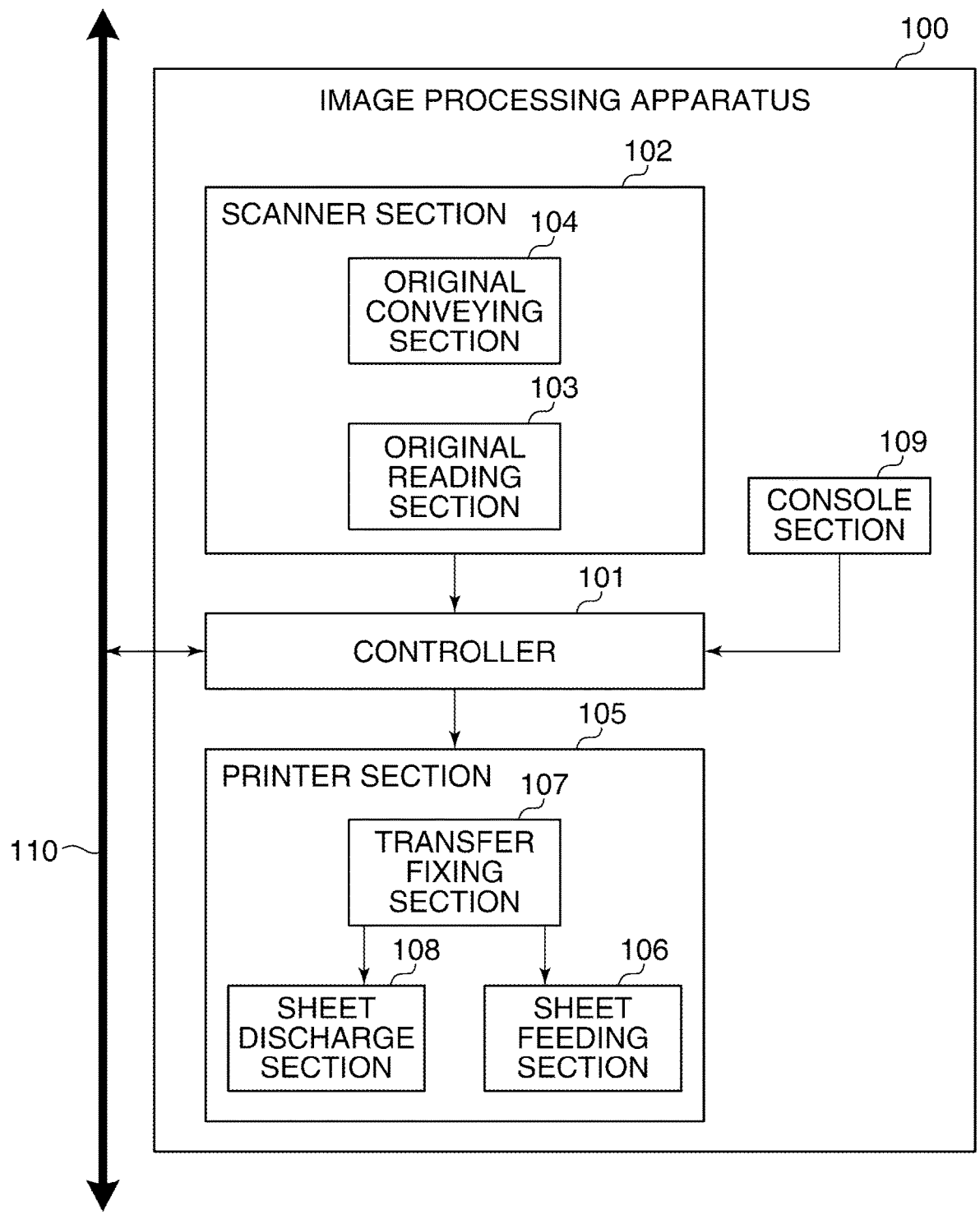
FIG. 1 is a schematic block diagram of an image processing apparatus according to an embodiment of the present invention.

FIG. 1 is a schematic block diagram of an image processing apparatus 100 according to an embodiment of the present invention.

Referring to FIG. 1, the image processing apparatus 100 includes a controller 101, a scanner section 102, a printer section 105, and a console section 109. The controller 101 is connected to the scanner section 102, the printer section 105, and the console section 109.

The image processing apparatus 100 is equipped with a copy function, a scan function, a print function, a data communication function, and so forth, and receives instructions for executing jobs each of which uses an associated one of these functions. For example, in a case where an instruction for executing a copy job which uses the copy function is received, the image processing apparatus 100 generates image data of an original read by the scanner section 102, and prints the generated image data using the printer section 105. Further, in a case where an instruction for executing a scan job which uses the scan function is received, the image processing apparatus 100 generates image data of an original read by the scanner section 102, and converts the generated image data to output image data, such as PDF data. The image processing apparatus 100 transmits the output image data to an external apparatus, not shown, via a network 110.

The controller 101 controls the overall operation of the image processing apparatus 100. The controller 101 will be described in detail hereinafter. The scanner section 102 includes an original reading section 103 and an original conveying section 104. The original reading section 103 optically reads an original, and transmits image data of the read original to the controller 101. The original reading section 103 will be described in detail hereinafter. The original conveying section 104 includes a conveying belt, not shown, and conveys an original to the original reading section 103. The printer section 105 includes a sheet feeding section 106, a transfer fixing section 107, and a sheet discharge section 108, and performs printing on a sheet as a recording sheet. The sheet feeding section 106 feeds a sheet. The transfer fixing section 107 transfers an image formed based on image data of an original read by the scanner section 102 onto a sheet, and further fixes the transferred image on the sheet. The sheet discharge section 108 performs post-processing, such as sorting and stapling, for a printed product, and outputs the printed product on which the post-processing has been performed to a discharge tray or the like, not shown. The console section 109 includes a touch panel and a plurality of operation buttons. The console section 109 is a user interface for receiving an input operation from a user, and receives a job execution instruction, an instruction for changing the settings of the image processing apparatus 100, and so forth.

Figure 2:
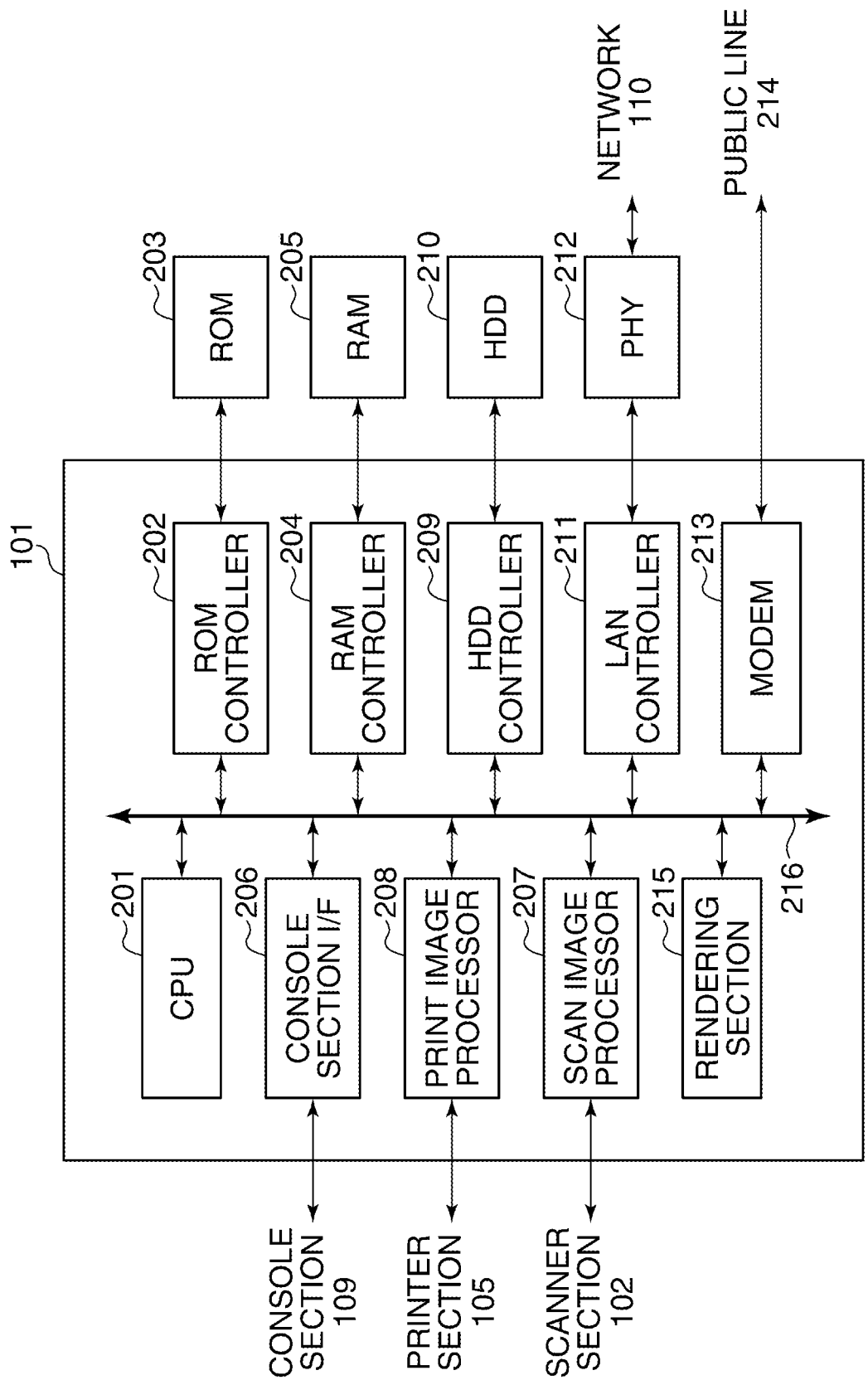
FIG. 2 is a schematic block diagram of a controller appearing in FIG. 1.

FIG. 2 is a schematic block diagram of the controller 101 appearing in FIG. 1.

Referring to FIG. 2, the controller 101 includes a CPU 201, a ROM controller 202, a RAM controller 204, a console section interface 206, a scan image processor 207, a print image processor 208, an HDD controller 209, a LAN controller 211, a modem 213, and a rendering section 215. The CPU 201, the ROM controller 202, the RAM controller 204, the console section interface 206, the scan image processor 207, the print image processor 208, the HDD controller 209, the LAN controller 211, the modem 213, and the rendering section 215 are interconnected via a system bus 216.

The CPU 201 controls the whole system of the image processing apparatus 100. The CPU 201 performs centralized control of execution of print processing, scan processing, and so forth, according to an OS and control programs loaded into a RAM 205. The ROM controller 202 accesses a ROM 203 storing a system boot program. For example, in a case where the image processing apparatus 100 is powered on, the ROM controller 202 accesses the ROM 203 to perform boot processing of the CPU 201. The RAM controller 204 accesses the RAM 205 storing system control programs and image data. The RAM controller 204 includes a register, not shown, for performing configuration and control of the RAM 205, and this register can be accessed from the CPU 201. The console section interface 206 controls, when the console section 109 is operated by a user, the display of the console section 109 according to the user's operation.

The scan image processor 207 performs scanner image processing, such as shading correction processing, MTF correction processing, gamma correction processing, and filtering, on image data generated by the scanner section 102. Further, the scan image processor 207 detects an abnormality of each synchronization signal, such as a page synchronization signal 303 and a line synchronization signal 304, described hereinafter with reference to FIG. 3, and corrects the detected abnormality of each synchronization signal. Further, the scan image processor 207 counts the number of times of abnormality detection from each synchronization signal. The scan image processor 207 will be described in detail hereinafter.

The print image processor 208 performs print image processing, such as color space conversion processing, halftone processing, and gamma correction processing, on image data generated by the scanner section 102, and transmits the image data on which the print image processing has been performed to the printer section 105. The HDD controller 209 controls writing and reading of data into and from an HDD 210. The HDD 210 stores system software modules, application programs, page information of image data, job information, and so forth. The LAN controller 211 performs data communication with an external apparatus connected to the network 110 via a PHY 212. The modem 213 performs FAX communication with an external apparatus connected to a public line 214. The rendering section 215 converts print data received from an external apparatus to bitmap data which can be analyzed by the printer section 105.

Figure 3:
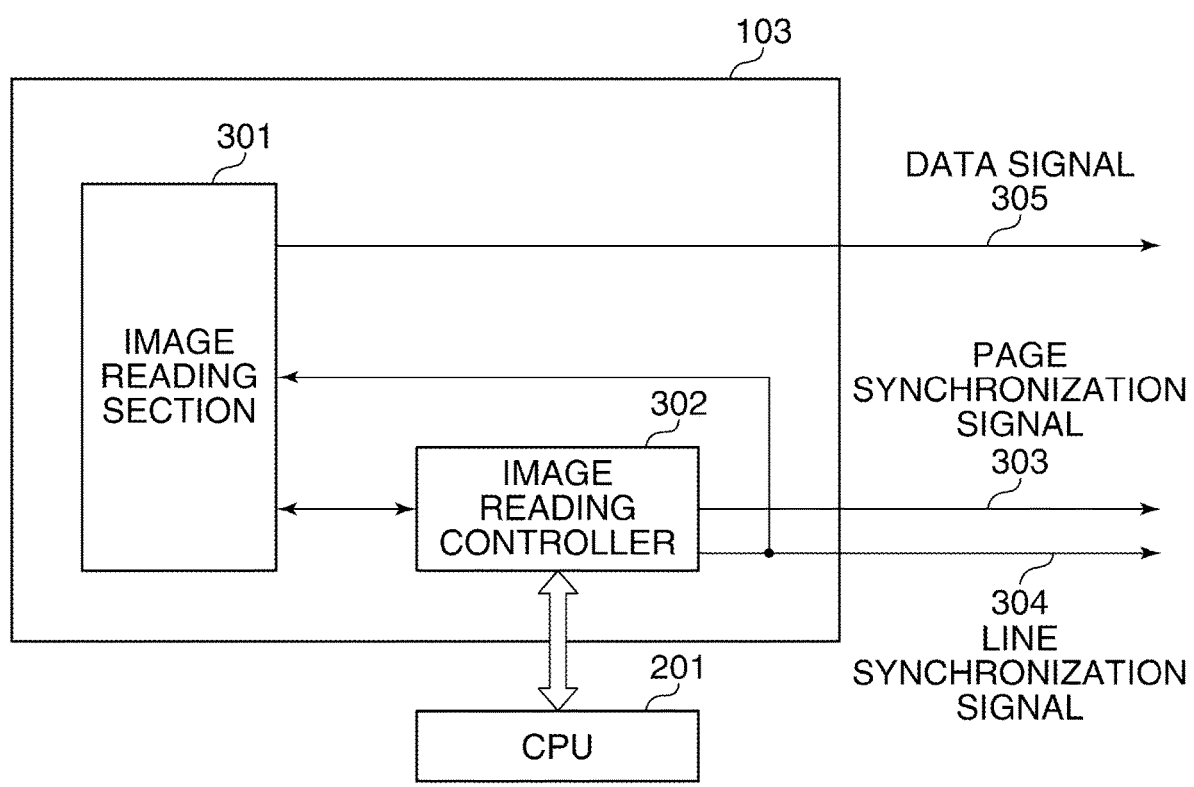
FIG. 3 is a schematic block diagram of an original reading section appearing in FIG. 1.

FIG. 3 is a schematic block diagram of the original reading section 103 appearing in FIG. 1.

Referring to FIG. 3, the original reading section 103 includes an image reading section 301 and an image reading controller 302.

The image reading section 301 is a scanner using a linear image sensor, not shown, such as a CCD, a CIS, and a CMOS sensor, and performs scan processing for generating image data of an original. When performing scan processing, the image reading section 301 irradiates an original with light using a light source, such as a white light source and an LED, and reads light reflected from the original using the linear image sensor. The linear image sensor can read image data of one line in a horizontal direction (main scanning direction) of a reading surface of the original. The image reading section 301 reads an image on an original by performing either a platen operation or an ADF (Auto Document Feeder) operation. In the platen operation, the image reading section 301 reads an original by moving the linear image sensor in a vertical direction (sub scanning direction) of a reading surface of an original. On the other hand, in the ADF operation, the image reading section 301 reads an original, by fixing the linear image sensor at a predetermined position, and operating an original feeder, not shown, to convey the original in the sub scanning direction.

The image reading controller 302 controls the image reading section 301 based on an instruction received from the CPU 201 to send the page synchronization signal 303, the line synchronization signal 304, and a data signal 305 to the controller 101. Note that in the present embodiment, the controller 101 and the scanner section 102 are connected by a plurality of wires associated respectively with the page synchronization signal 303, the line synchronization signal 304, and the data signal 305, on the printed circuit board.

The page synchronization signal 303 is a low active signal which indicates a page feed position in the data signal 305. The state of the page synchronization signal 303 is shifted from a high level to a low level (hereinafter referred to as "asserted") when the image reading controller 302 starts to transmit data of the data signal 305 corresponding to image data of one page of an original. For example, in a case where the platen operation is performed by the image reading section 301, the page synchronization signal 303 is asserted when the linear image sensor is moved to a reference position. Further, in a case where the ADF operation is performed by the image reading section 301, the page synchronization signal 303 is asserted when an original is moved to a reading start position by the original feeder. After that, when a predetermined time period, for example, a time period, denoted by reference numeral 401 in FIG. 4A, elapses, the state of the page synchronization signal 303 is shifted from the low level to the high level (hereinafter referred to as "deasserted"). The page synchronization signal 303 repeats the above-mentioned shifts of the state thereof at a period of page change in the data signal 305. The period of the page synchronization signal 303 is determined based on the number of effective lines of each read original.

The line synchronization signal 304 is a low active signal which indicates a line feed position in the data signal 305. The line synchronization signal 304 is asserted when the image reading controller 302 starts to transmit data of the data signal 305 corresponding to one line in the image data, and is deasserted when a predetermined time period, for example, a time period 402 in FIG. 4A, elapses. The line synchronization signal 304 repeats the above-mentioned shifts of the state thereof at a period of line change in the data signal 305 (denoted by reference numeral 403 in FIG. 4B). The period 403 of the line synchronization signal 304 is determined based on the number of effective pixels of each line of a read original.

The data signal 305 is a signal corresponding to image data of an original read by the image reading section 301. For example, the data signal 305 has an 8-bit signal value indicating each color of R, G, and B in a range of 0 to 255. In the present embodiment, for example, the image reading controller 302 starts to transmit data of the data signal 305 corresponding to the first line in the image data when the state of the page synchronization signal 303 is shifted from the high level to the low level as in the time period 401 in FIG. 4A, and then the state of the line synchronization signal 304 is shifted from the high level to the low level as in the time period 402 in FIG. 4A. The controller 101, which receives the above-mentioned signals, grasps the page feed position in the data signal 305 based on the page synchronization signal 303 and the line feed position in the data signal 305 based on the line synchronization signal 304.

Figure 5:
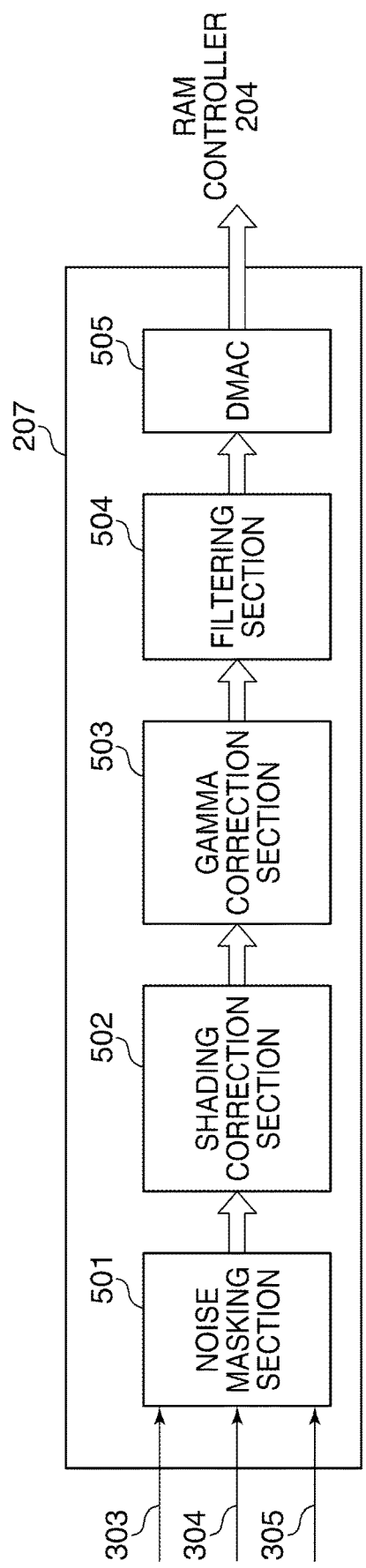
FIG. 5 is a schematic block diagram of a scan image processor appearing in FIG. 2.

FIG. 5 is a schematic block diagram of the scan image processor 207 appearing in FIG. 2.

Referring to FIG. 5, the scan image processor 207 includes a noise masking section 501, a shading correction section 502, a gamma correction section 503, a filtering section 504, and a DMAC 505.

The noise masking section 501 detects an abnormality occurring in a synchronization signal. For example, when abnormal periodic time is detected, as in a case where the line synchronization signal 304 is asserted in a period shorter than the period of the line synchronization signal 304, the noise masking section 501 determines the line synchronization signal 304 as abnormal. The noise masking section 501 performs masking for eliminating the abnormality from the synchronization signal, and further, counts the number of times of abnormality detection from the line synchronization signal 304. The noise masking section 501 will be described in detail hereinafter. The shading correction section 502 performs processing for correcting a variation in luminance ascribable to characteristics of an optical system or an image pickup system. The gamma correction section 503 performs gamma correction on the image data based on a lookup table stored in advance. The filtering section 504 performs filtering for character edge enhancement and photographic image smoothing. The DMAC 505 is a direct memory access controller, and transmits the image data on which the filtering has been performed to the RAM controller 204. The RAM controller 204 stores the image data in the RAM 205.

Figure 6:
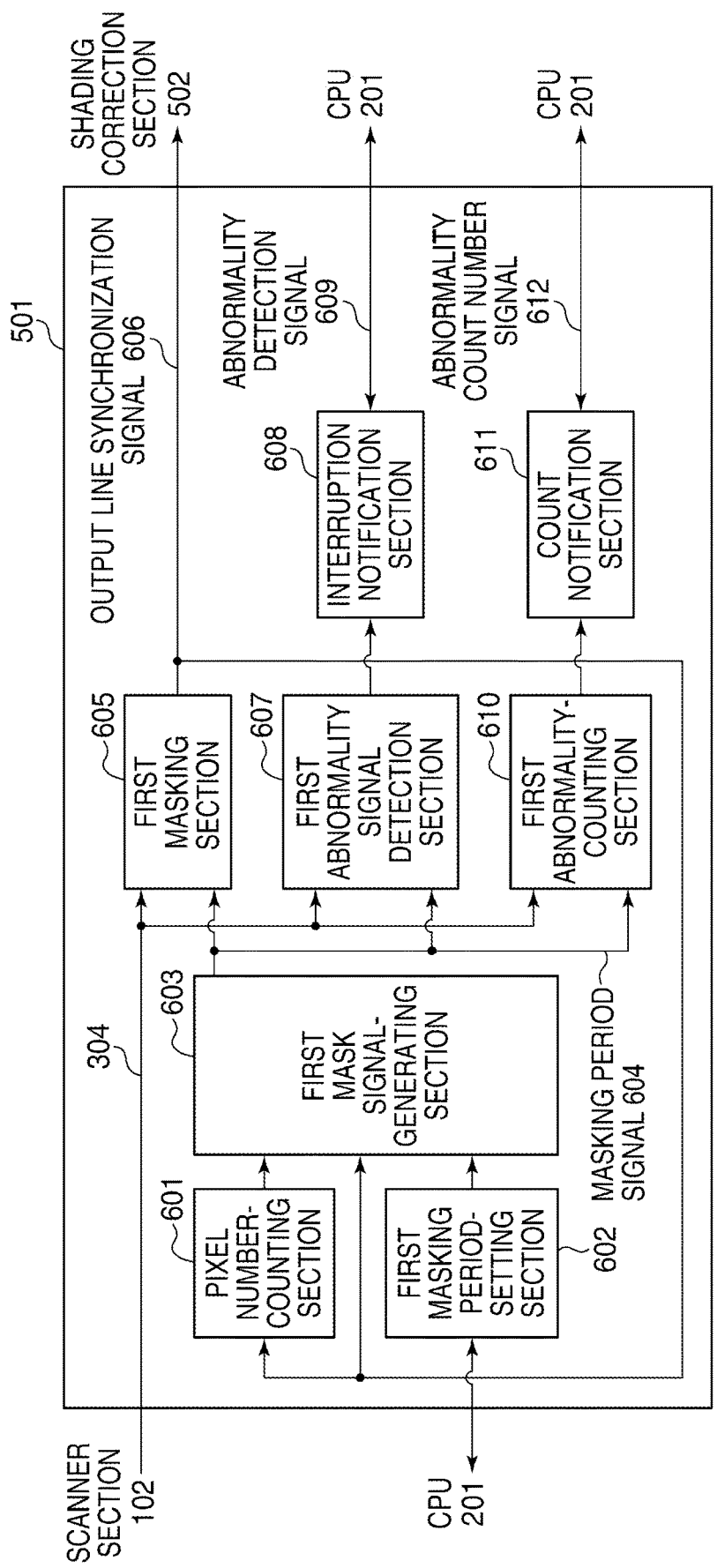
FIG. 6 is a schematic block diagram of a noise masking section appearing in FIG. 5.

FIG. 6 is a schematic block diagram of the noise masking section 501 appearing in FIG. 5. Note that in the present embodiment, a description will be given of the noise masking section 501 that detects an abnormality of the line synchronization signal 304, out of the page synchronization signal 303 and the line synchronization signal 304, by way of example.

Referring to FIG. 6, the noise masking section 501 includes a pixel number-counting section 601, a first masking period-setting section 602, a first mask signal-generating section 603, a first masking section 605, a first abnormality signal detection section 607, an interruption notification section 608, a first abnormality-counting section 610 (count unit), and a count notification section 611.

The pixel number-counting section 601 counts the number of pixels of image data received from the scanner section 102. The pixel number-counting section 601 increments the count value when one pixel of data of the data signal 305 is received, and clears the count value when an output line synchronization signal 606 output from the first masking section 605 is asserted. The first masking period-setting section 602 sets a time period over which masking on the line synchronization signal 304 is performed (hereinafter referred to as the "first masking effective period"), according to an instruction from the CPU 201.

The first mask signal-generating section 603 generates a masking period signal 604 based on the set first masking effective period. The masking period signal 604 is a signal indicative of the first masking effective period and a time period over which masking on the line synchronization signal 304 is not performed (hereinafter referred to as the "first masking ineffective period"). The masking period signal 604 is a high active signal, and for example, when the line synchronization signal 304 is deasserted as indicated by a state 701 in FIG. 7, the state of the masking period signal 604 is shifted to the high level indicative of the first masking effective period. Further, when the first masking effective period elapses after the shift of the state of the masking period signal 604 to the high level, the state of the masking period signal 604 is shifted to the low level indicative of the first masking ineffective period.

Figure 7:
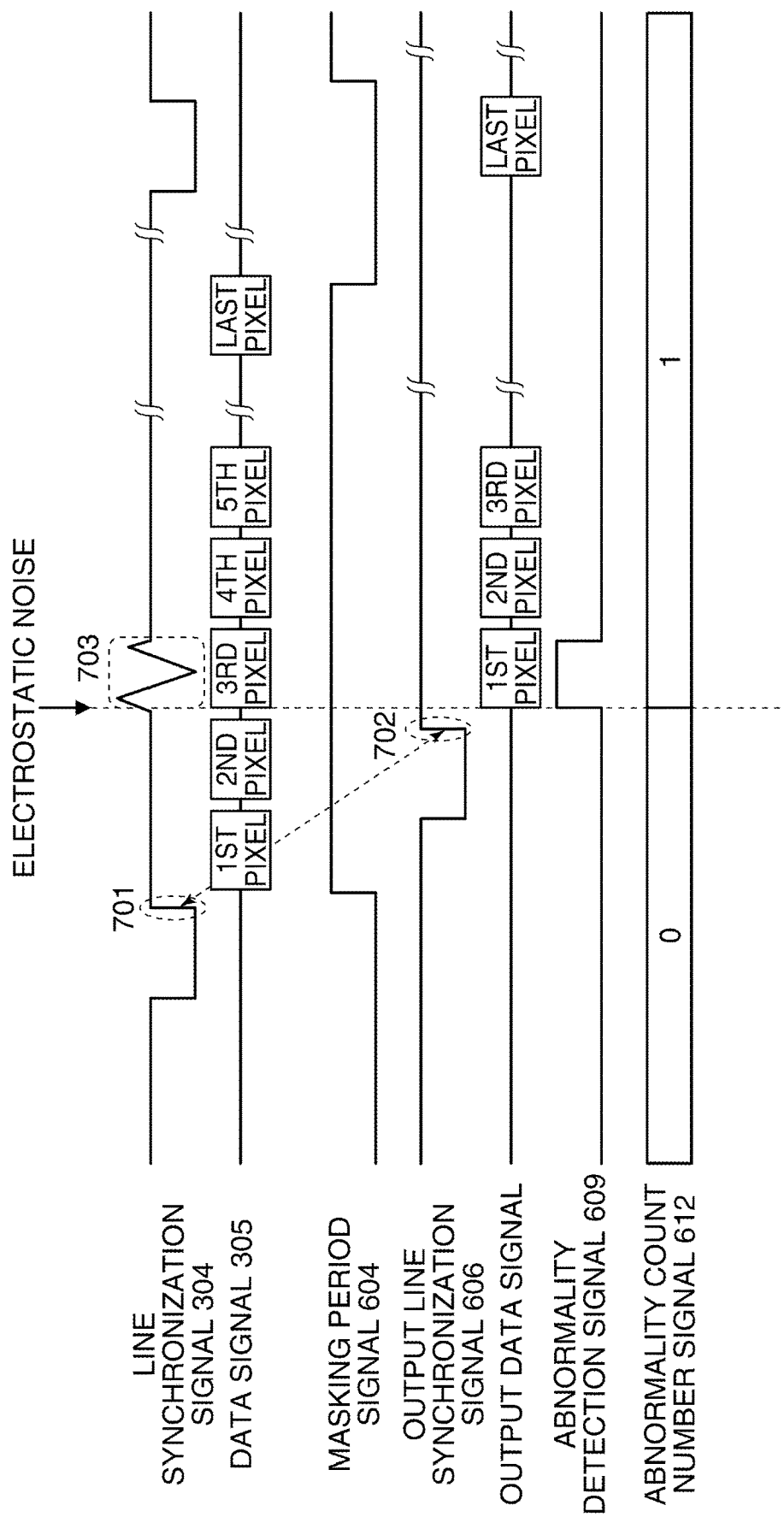
FIG. 7 is a diagram useful in explaining a relationship between the line synchronization signal and an output line synchronization signal.

The first masking section 605 outputs the output line synchronization signal 606 based on the line synchronization signal 304 and the masking period signal 604. The output line synchronization signal 606 is a signal generated by performing the masking on the line synchronization signal 304 received from the scanner section 102. In the first masking ineffective period, the first masking section 605 outputs the received line synchronization signal 304, e.g. in the state 701, as the output line synchronization signal 606 in a state 702 without processing the signal. Note that FIG. 7 shows a case where the output line synchronization signal 606 is output with a delay corresponding to a predetermined time period taken by the first masking section 605 to perform masking.

On the other hand, in the first masking effective period, the first masking section 605 outputs the high-level output line synchronization signal 606 irrespective of the state of the received line synchronization signal 304. With this, even when abnormal periodicity of the line synchronization signal 304 occurs due to electrostatic noise (such as a state 703 in FIG. 7), the controller 101 can accurately grasp the line feed position in the data signal 305 using the output line synchronization signal 606.

The first abnormality signal detection section 607 detects an abnormality of the line synchronization signal 304. The interruption notification section 608 transmits, when the first abnormality signal detection section 607 detects an abnormality of the line synchronization signal 304, an abnormality detection signal 609 indicative of this fact to the CPU 201. The first abnormality-counting section 610 counts the number of times of abnormality detection from the line synchronization signal 304. The first abnormality-counting section 610 clears the count value on a line-by-line basis or on a page-by-page basis. In the present embodiment, a value counted until the value is cleared may be held as the maximum number of times of abnormality detection from the line synchronization signal 304. The count notification section 611 transmits the number of times of abnormality detection, counted by the first abnormality-counting section 610, to the CPU 201 as an abnormality count number signal 612.

Figure 8:
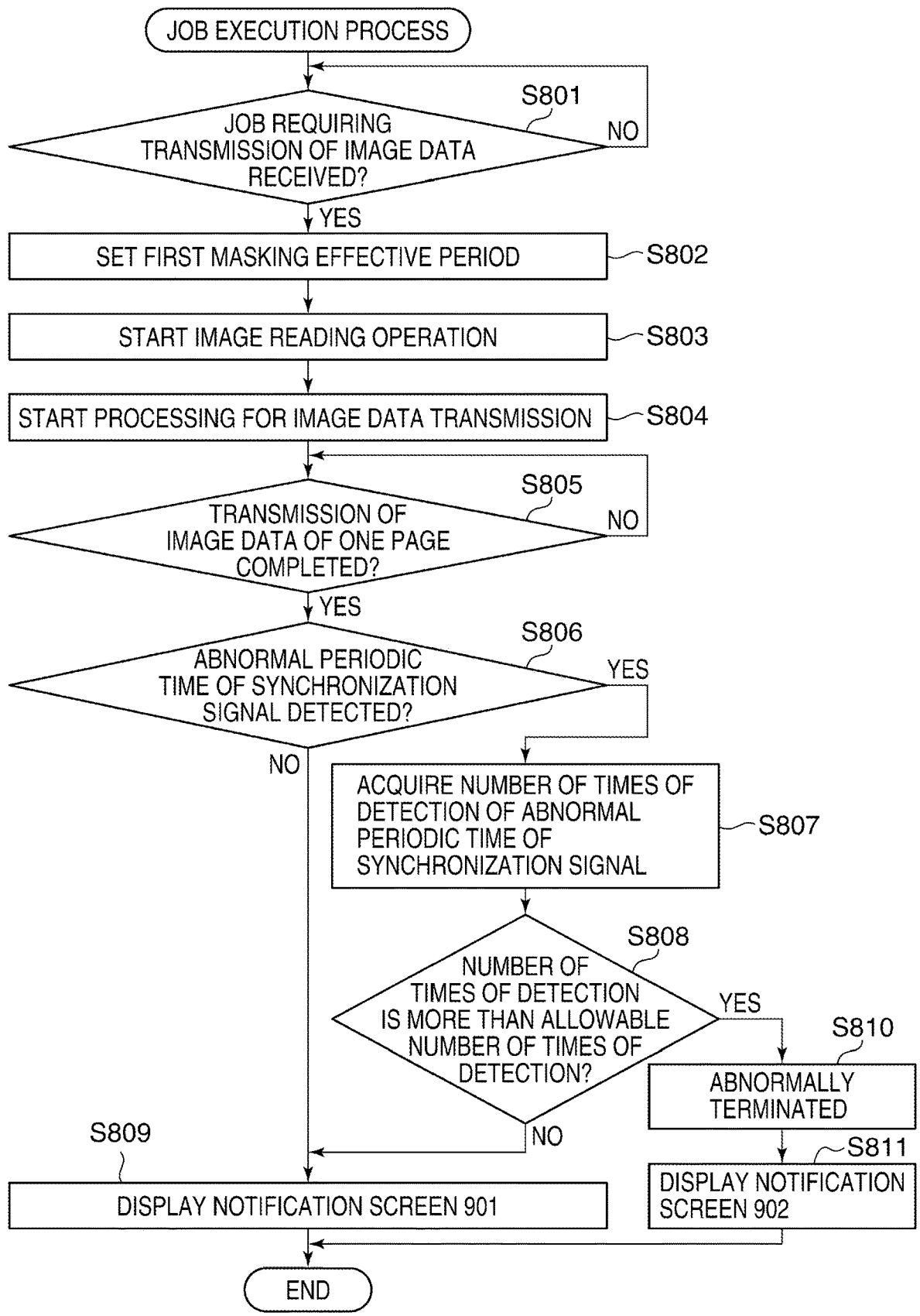
FIG. 8 is a flowchart of a job execution process performed by the image processing apparatus shown in FIG. 1.

FIG. 8 is a flowchart of a job execution process performed by the image processing apparatus 100 shown in FIG. 1.

The job execution process in FIG. 8 is performed by the CPU 201 that executes a program stored e.g. in the HDD 210.

In the image processing apparatus 100, an abnormality occurring in the line synchronization signal 304 due to electrostatic noise is eliminated by masking performed by the noise masking section 501. On the other hand, there is a case where the wire for the data signal 305 is arranged adjacent to the wire for the line synchronization signal 304 or the like due to restriction of the arrangement on the printed circuit board of the image processing apparatus 100. In this case, an abnormality also occurs in the data signal 305 due to electrostatic noise, and even when the abnormality occurring in the line synchronization signal 304 is eliminated by the noise masking section 501, the image quality of the output image data is degraded by the abnormality occurring in the data signal 305. To solve this problem, it is envisaged to provide an additional buffer in the image processing apparatus 100, hold one line of data of the data signal 305 in the buffer memory, and replace the one line of data of the data signal, which is determined as abnormal, with the preceding line of data of the data signal. However, the above-mentioned method requires provision of an additional buffer for holding one line of data of the data signal so as to suppress degradation of the image quality of output image data, which increases the circuit scale. That is, the conventional technique cannot suppress degradation of the image quality of output image data, caused by electrostatic noise, without increasing the circuit scale.

In contrast, according to the present embodiment, a notification screen is displayed which includes an abnormality coping method determined based on the number of times of detection of abnormal periodicity of the synchronization signal.

Referring to FIG. 8, first, if a job requiring transmission of image data from the scanner section 102 to the controller 101, such as a scan job, has been received (YES to a step S801), the CPU 201 sets the first masking effective period (step S802). Then, the CPU 201 starts the image reading operation of the scan job (step S803). More specifically, the CPU 201 controls the image reading controller 302 so as to cause the image reading section 301 to read an original placed on the platen glass or the ADF, and generate image data based on the information acquired by reading the original.

Then, the CPU 201 starts processing for transmitting the image data from the scanner section 102 to the controller 101 (step S804). In the step S804, the data signal 305 corresponding to the image data is output from the scanner section 102 to the controller 101, and further, the page synchronization signal 303 and the line synchronization signal 304 which are synchronized with the data signal 305 are also output. Then, when the transmission of one page of the image data is completed (YES to a step S805), the CPU 201 determines whether or not abnormal periodicity of a synchronization signal has been detected during the transmission of the one page of the image data (step S806). More specifically, in the step S806, in the present embodiment, the CPU 201 checks whether or not the abnormal detection signal 609 indicative of an abnormality of the line synchronization signal 304 has been received from the interruption notification section 608.

If it is determined in the step S806 that abnormal periodicity of the synchronization signal has been detected, the CPU 201 acquires the number of times of detection of abnormal periodicity of the synchronization signal (step S807), and determines whether or not the acquired number of times of abnormality detection is more than an allowable number of times of abnormality detection, set in advance (step S808).

Figure 9A:
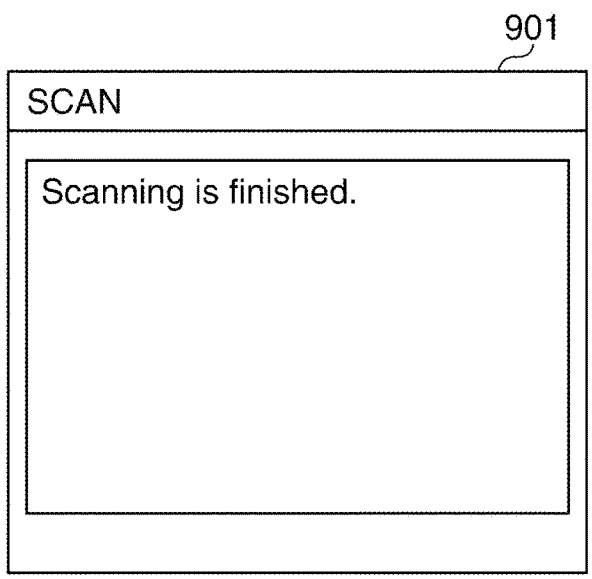
FIGS. 9A to 9C are diagrams each showing an example of a notification screen displayed on a console section appearing in FIG. 1.

If it is determined in the step S806 that abnormal periodicity of the synchronization signal has not been detected, or if it is determined in the step S808 that the number of times of abnormality detection is not more than the allowable number of times of abnormality detection, the CPU 201 normally terminates the job. In this case, the CPU 201 displays a notification screen 901 shown in FIG. 9A, including a message to the effect that the job has been normally terminated, on the console section 109 (step S809). After that, the CPU 201 terminates the present process.

Figure 9B:
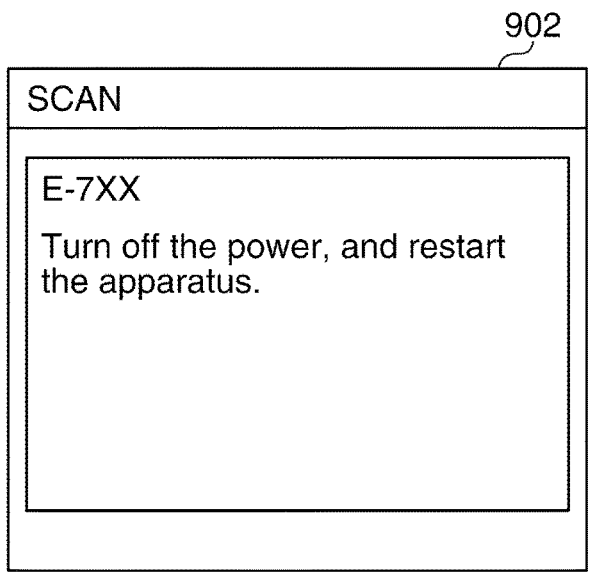

If it is determined in the step S808 that the number of times of abnormality detection is more than the allowable number of times of abnormality detection, the CPU 201 terminates the job as abnormal termination (step S810), and displays a notification screen 902 shown in FIG. 9B on the console section 109 (step S811). The notification screen 902 includes an error code (E-7XX) indicating abnormal termination of the job and a message prompting the user to restart the image processing apparatus 100. The notification screen 902 may also include a message prompting the user to reinput the scan job for regenerating the output image data which has been found to be degraded in image quality. Thus, in the present embodiment, a notification is made which includes an abnormality coping method determined based on the number of times of detection of abnormal periodicity of the synchronization signal. Then, the CPU 201 terminates the present process.

According to the job execution process in FIG. 8, the notification is made which includes the abnormality coping method determined based on the number of times of abnormality detection from the synchronization signal. This makes it possible to notify the user of how to cope with the problem, depending on the number of times of abnormality detection from the synchronization signal. As a result, it is possible to suppress degradation of the image quality of output image data, which is caused by electrostatic noise, without suffering from an increase in the circuit scale caused by provision of a buffer.

Further, in the above-described job execution process in FIG. 8, in a case where the number of times of abnormality detection from the synchronization signal is more than the allowable number of times of abnormality detection, the notification is made for prompting the user to restart the image processing apparatus 100. This makes it possible to generate output image data which is improved in image quality.

Further, in the above-described job execution process in FIG. 8, the abnormality of a synchronization signal refers to a change in the state thereof occurring in a shorter periodic time than the proper periodic time of the synchronization signal. That is, even when the abnormality, such as a change in the state of the synchronization signal in a shorter periodic time than the proper periodic time of the synchronization signal, occurs in the data signal 305 due to electrostatic noise, it is possible to suppress degradation of the image quality of output image data without increasing the circuit scale.

Figure 9C:
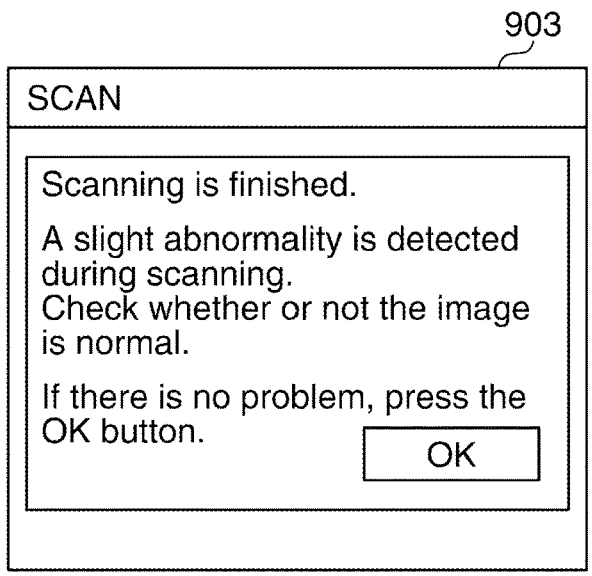

Although the present invention is described with reference to the above-described embodiment, the present invention is not limited to the above-described embodiment. For example, if it is determined in the step S809 that the number of times of abnormality detection is not less than 1 and not more than the allowable number of times of abnormality detection, the CPU 201 may display a notification screen 903 shown in FIG. 9C on the console section 109. The notification screen 903 includes a message for prompting the user to check whether or not the output image data is normal. This makes it possible to notify the user of concern about degradation of the image quality of the output image data, caused by a slight degree of abnormality occurring in a synchronization signal.

Further, in the above-described embodiment, the number of times of abnormality detection from the synchronization signal may be transmitted to another apparatus. For example, the number of times of abnormality detection from the synchronization signal is transmitted to a management server that manages the number of times of abnormality detection from the synchronization signal on a model-by-model basis. This makes it possible to make effective use of the number of times of detection of an abnormality of a synchronization signal, which has occurred in the image processing apparatus 100, for analyzing an error occurring in an image processing apparatus of the same model as that of the image processing apparatus 100.

Figure 10:
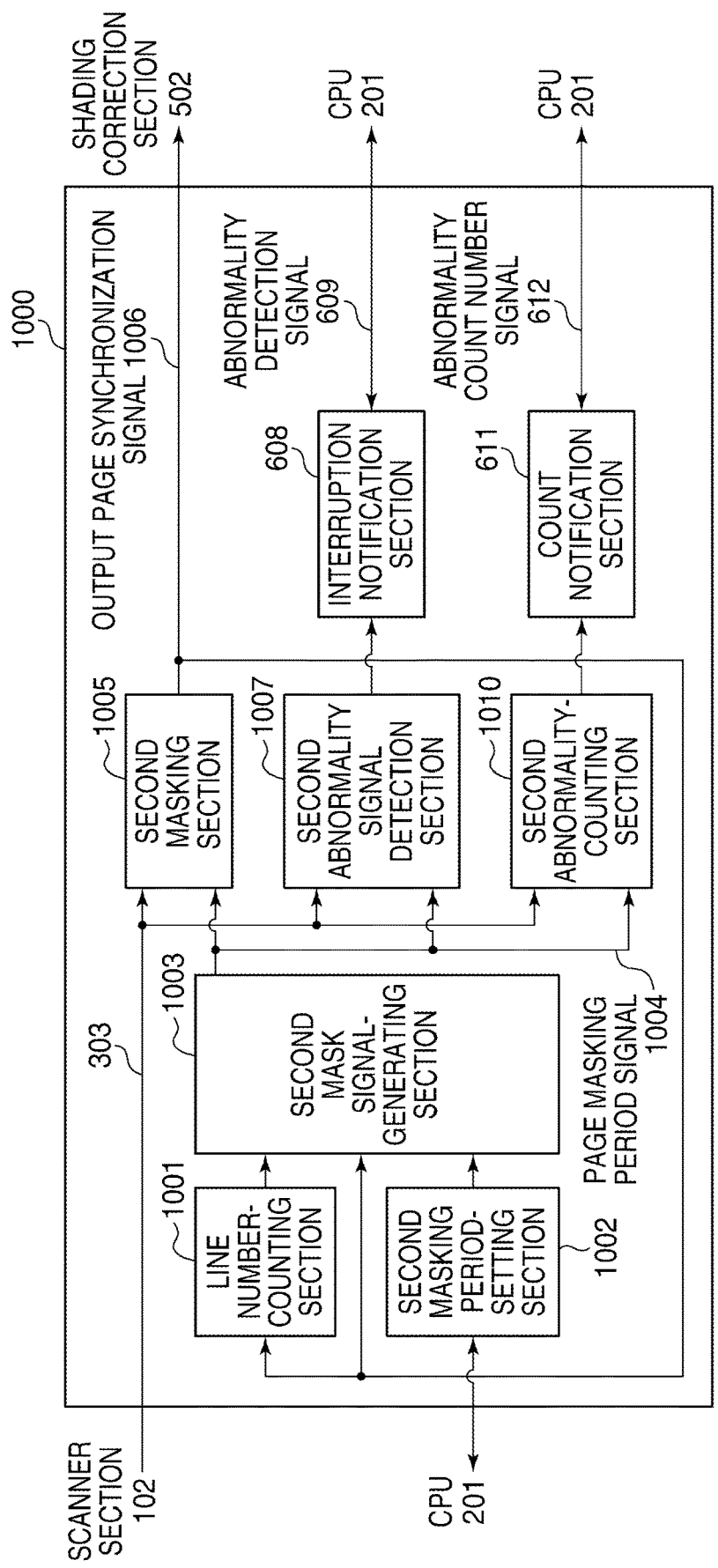
FIG. 10 is a schematic block diagram of a variation of the noise masking section shown in FIG. 6.

Further, in the above-described embodiment, the image processing apparatus 100 may include a noise masking section 1000 shown in FIG. 10, which detects an abnormality of the page synchronization signal 303.

FIG. 10 is a schematic block diagram of the noise masking section 1000 as a variation of the noise masking section 501 described with reference to FIG. 6.

Referring to FIG. 10, the noise masking section 1000 differs from the noise masking section 501 shown in FIG. 6 in that the pixel number-counting section 601, the first masking period-setting section 602, the first mask signal-generating section 603, the first masking section 605, the first abnormality signal detection section 607, and the first abnormality-counting section 610 (count unit) except the interruption notification section 608 and the count notification section 611 are replaced by a line number-counting section 1001, a second masking period-setting section 1002, a second mask signal-generating section 1003, a second masking section 1005, a second abnormality signal detection section 1007, and a second abnormality-counting section 1010 (count unit).

The line number-counting section 1001 counts the number of lines of image data received from the scanner section 102. The line number-counting section 1001 increments the count value when one line of data of the data signal 305 is received, and clears the count value when an output page synchronization signal 1006 output from the second masking section 1005 is asserted. The second masking period-setting section 1002 sets a time period over which masking on the page synchronization signal 303 is performed (hereinafter referred to as the "second masking effective period"), according to an instruction from the CPU 201. The second mask signal-generating section 1003 generates a page masking period signal 1004 based on the set second masking effective period. The page masking period signal 1004 is a signal indicative of the second masking effective period and a period over which masking on the page synchronization signal 303 is not performed (hereinafter referred to as the "second masking ineffective period"). The page masking period signal 1004 is a high active signal. For example, when the page synchronization signal 303 is deasserted as indicated by a state 1101 in FIG. 11, the state of the page masking period signal 1004 is shifted to the high level indicative of the second masking effective period. Further, when the second masking effective period elapses after the shift of the state of the page masking period signal 1004 to the high level, the state of the page masking period signal 1004 is shifted to the low level indicative of the second masking ineffective period.

The second masking section 1005 outputs the output page synchronization signal 1006 based on the page synchronization signal 303 and the page masking period signal 1004. The output page synchronization signal 1006 is a signal generated by performing the masking on the page synchronization signal 303 received from the scanner section 102. In the second masking ineffective period, the second masking section 1005 outputs the received page synchronization signal 303, e.g. in the state 1101, as the output page synchronization signal 1006 in a state 1102 without processing the signal. On the other hand, in the second masking effective period, the second masking section 1005 outputs the high-level output page synchronization signal 1006 irrespective of the state of the received page synchronization signal 303. With this, even when abnormal periodicity of the page synchronization signal 303 occurs due to electrostatic noise (such as a state 1103 in FIG. 11), the controller 101 can accurately grasp the page feed position in the data signal 305 using the output page synchronization signal 1006. The second abnormality signal detection section 1007 detects an abnormality of the page synchronization signal 303. The second abnormality-counting section 1010 counts the number of times of abnormality detection from the page synchronization signal 303.

The image processing apparatus 100 including the noise masking section 1000 also performs a job execution process similar to the job execution process in FIG. 8. More specifically, the CPU 101 executes the step S801. Then, the CPU 101 sets the second masking effective period. Then, the CPU 101 executes the steps S803 to S806. In the step S806, in this variation, the CPU 201 checks whether or not the abnormality detection signal 609 indicative of an abnormality of the page synchronization signal 303 has been received from the interruption notification section 608. If it is determined in the step S806 that abnormal periodicity of the synchronization signal has been detected, the CPU 201 executes the step S807 et seq. On the other hand, if it is determined in the step S806 that abnormal periodicity of the synchronization signal has not been detected, the CPU 201 executes the step S809 et seq. Thus, according to this variation, when an abnormality of the page synchronization signal 303 is detected as well, the notification is made which includes the abnormality coping method determined based on the number of times of abnormality detection from the synchronization signal, whereby it is possible to obtain the same advantageous effects as provided by the above-described embodiment.

Further, in the above-described embodiment, the image processing apparatus 100 may include both of the noise masking sections 501 and 1000.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-171328 filed Sep. 6, 2017, which is hereby incorporated by reference herein in its entirety.

What is claimed is:

1. An image processing apparatus that transmits image data obtained by reading an original, in synchronism with a synchronization signal, comprising:
    a noise detection unit configured to detect an occurrence of noise in the synchronization signal;
    a noise elimination unit configured to eliminate noise from the synchronization signal;
    a print unit configured to print an image using the image data;
    a count unit configured to count a total number of times that the occurrence of noise is detected in the synchronization signal per one line or per one page; and
    a notification unit configured to notify the total number of times that the occurrence of noise is detected in the synchronization signal per one line or per one page, counted by the count unit to prompt a user of the image processing apparatus to take certain action, based on the total number, with respect to an operation of the image processing apparatus.

2. The image processing apparatus according to claim 1, wherein the notification unit notifies visual contents determined based on the total number of times that the occurrence of noise is detected in the synchronization signal per one line or per one page counted by the count unit.

3. The image processing apparatus according to claim 1, wherein in a case where the total number of times that the occurrence of noise is detected in the synchronization signal per one line or per one page, counted by the count unit, is more than a preset number, the notification unit makes a notification for prompting to restart the image processing apparatus.

4. The image processing apparatus according to claim 3, further comprising an output unit configured to output an image based on the image data, and
wherein in a case where the total number of times that the occurrence of noise is detected in the synchronization signal per one line or per one page, counted by the count unit, is not less than 1, and is not more than the preset number, the notification unit makes a notification for prompting to check the image output by the output unit.

5. The image processing apparatus according to claim 1, wherein the noise in the synchronization signal is a change in a state of the synchronization signal in a shorter periodic time than a periodic time of the synchronization signal.

6. The image processing apparatus according to claim 1, further comprising a communication unit configured to perform data communication with a management server that manages the total number of times that the occurrence of noise is detected in the synchronization signal per one line or per one page on a model-by-model basis, and
wherein the communication unit transmits the total number of times that the occurrence of noise is detected in the synchronization signal per one line or per one page to the management server.

7. The image processing apparatus according to claim 1, wherein the notification unit notifies the total number of times that the occurrence of noise is detected in the synchronization signal per one line and the total number of times that the occurrence of noise is detected in the synchronization signal per one page, counted by the count unit.

8. The image processing apparatus according to claim 1, further comprising a reading unit configured to read an original,
wherein the total number of times that the occurrence of noise is detected in the synchronization signal per one line is the number of noises detected when the reading unit reads one line of the original.

9. The image processing apparatus according to claim 1, further comprising a reading unit configured to read an original,
wherein the total number of times that the occurrence of noise is detected in the synchronization signal per one page is the number of noises detected when the reading unit reads one page of the original.

10. The image processing apparatus according to claim 1, wherein the count unit counts the total number of times that the occurrence of noise is detected in the synchronization signal per one line or per one page, thereby obtaining an accumulation of the number of times that the occurrence of the noise is detected in the synchronization signal per one line or per one page.

11. A method of controlling an image processing apparatus that transmits image data obtained by reading an original, in synchronism with a synchronization signal, comprising:
detecting an occurrence of noise in the synchronization signal;
eliminating noise from the synchronization signal;
printing an image using the image data;
counting a total number of times that the occurrence of noise is detected in the synchronization signal per one line or per one page; and
notifying the counted total number of times of detection of the noise that the occurrence of noise is detected in the synchronization signal per one line or per one page to prompt a user of the image processing apparatus to take certain action, based on the total number, with respect to an operation of the image processing apparatus.

12. The method according to claim 11, wherein said notifying includes notifying visual contents determined based on the counted total number of times that the occurrence of noise is detected in the synchronization signal per one line or per one page.

13. The method according to claim 11, wherein in a case where the counted total number of times that the occurrence of noise is detected in the synchronization signal per one line or per one page is more than a preset number, said notifying includes making a notification for prompting to restart the image processing apparatus.

14. The method according to claim 13, further comprising outputting an image based on the image data, and
wherein in a case where the counted total number of times that the occurrence of noise is detected in the synchronization signal per one line or per one page is not less than 1 and is not more than the preset number, said notifying includes making a notification for prompting to check the output image.

15. The method according to claim 11, wherein the noise in the synchronization signal is a change in a state of the synchronization signal in a shorter periodic time than a periodic time of the synchronization signal.

16. The method according to claim 11, further comprising performing data communication with a management server that manages the total number of times that the occurrence of noise is detected in the synchronization signal per one line or per one page on a model-by-model basis, and
wherein said data communication includes transmitting the total number of times that the occurrence of noise is detected in the synchronization signal per one line or per one page to the management server.

17. A non-transitory computer-readable storage medium storing a computer-executable program for executing a method of controlling an image processing apparatus that transmits image data obtained by reading an original, in synchronism with a synchronization signal,
wherein the method comprises:
detecting an occurrence of noise in the synchronization signal;
eliminating noise from the synchronization signal;
printing an image using the image data;
counting a total number of times that the occurrence of noise is detected in the synchronization signal per one line or per one page; and
notifying the counted total number of times that the occurrence of noise is detected in the synchronization signal per one line or per one page to prompt a user of the image processing apparatus to take certain action, based on the total number, with respect to an operation of the image processing apparatus.

* * * * *